J. WILDING.
LOCK FOR STEERING WHEELS.
APPLICATION FILED JULY 23, 1919.
1,354,153.
Patented Sept. 28, 1920.
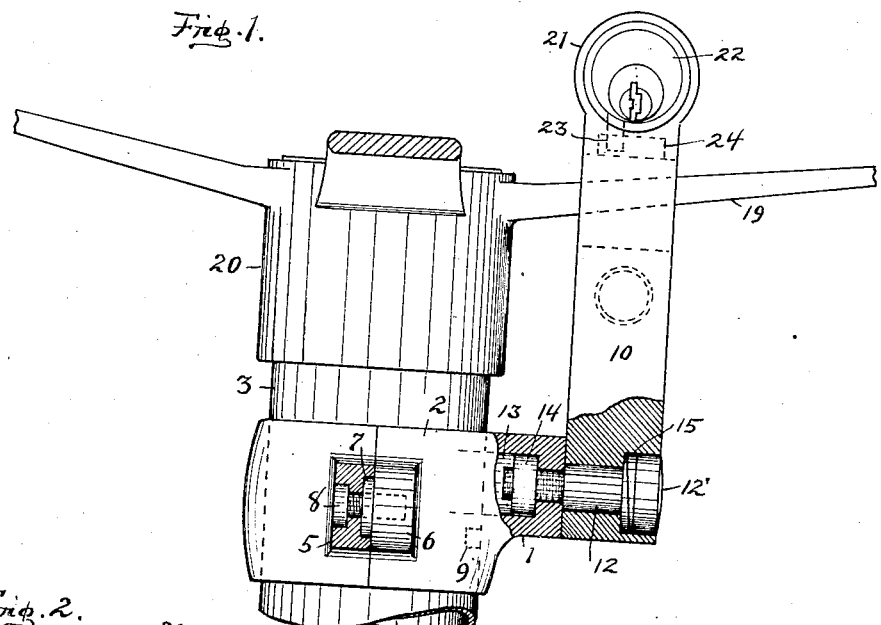
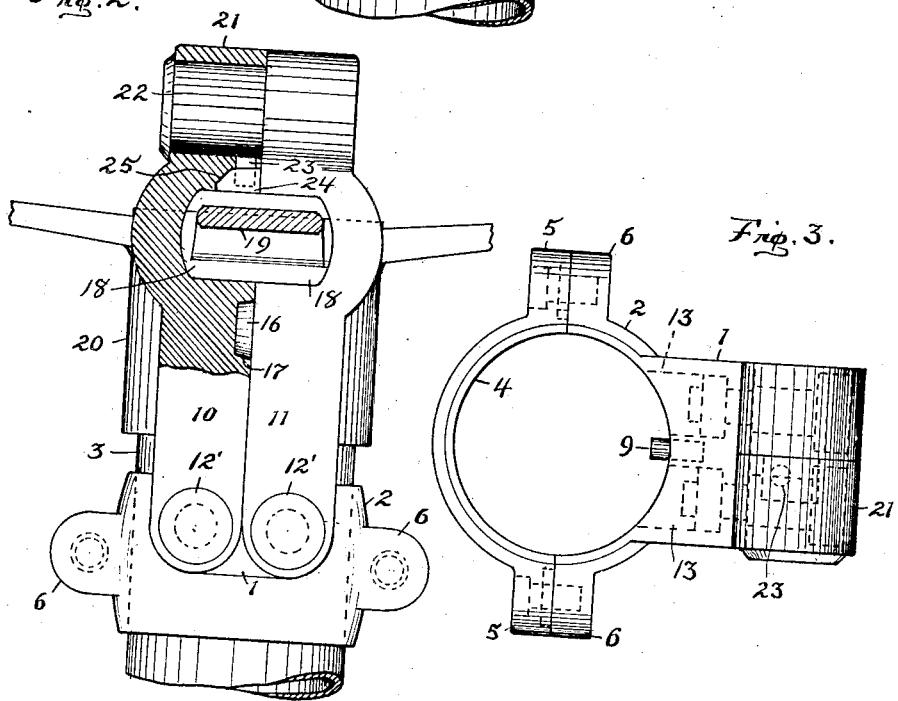
John Wilding  INVENTOR
BY
A. G. Burns  ATTORNEY

UNITED STATES PATENT OFFICE.

JOHN WILDING, OF FORT WAYNE, INDIANA.

LOCK FOR STEERING-WHEELS.

1,354,153.  Specification of Letters Patent.  Patented Sept. 28, 1920.

Application filed July 23, 1919. Serial No. 312,756.

*To all whom it may concern:*

Be it known that I, JOHN WILDING, a citizen of the United States of America, and resident of Fort Wayne, in the county of Allen and State of Indiana, have invented certain new and useful Improvements in Locks for Steering-Wheels, of which the following is a specification.

This invention relates to improvements in locks for steering wheels and the object thereof is to provide means to prevent unauthorized operation of automobiles by securing the steering wheels thereof against being turned.

The object of the invention is accomplished by the construction illustrated in the accompanying drawing in which:—

Figure 1 is a side elevation broken away and partly in section showing the invention mounted upon a steering column and in locked relation with a steering wheel;

Fig. 2 is a front elevation of Fig. 1 shown broken away and partly in section; and Fig. 3 is a plan view of the invention with the steering wheel omitted.

Similar characters of reference indicate corresponding parts throughout the several views and referring now to the same, 1 is a base having a collar 2 adapted to span the steering column 3 of an automobile. The collar has a separable part 4, there being a pair of oppositely projecting lugs 5 on the separable part and a corresponding pair of lugs 6 on the part that is integral with the base. Each lug 6 has a projection 7 that extends into the corresponding lug 5 and a bolt 8 extends through the lug 5 into the lug 6 for securing the same together. The base has an inwardly extending stud 9 that projects into the steering column and prevents the base from turning thereon.

A pair of shackles 10 and 11 respectively are pivotally mounted at the outer end of the base upon corresponding screws 12, the later being round-headed and without slots, the shackles being recessed so that the heads 12' of the screws are flush with the outer surfaces thereof. The inner end of each screw 12 extends into a corresponding internal recess 13 in the base and upon its inner end is a nut 14 for securing the screw in fixed position. Also a spring washer 15 is arranged under the head of each screw and bears against the corresponding shackle so that the latter is held inert. The pivoted end of each shackle is rounded so that as the shackles are swung apart the one will not interfere with the movement of the other. The shackle 11 has a projecting stud 16 on its inner face that extends into a corresponding recess 17 in the shackle 10 so that the shackles will be held in proper alinement when in locked position. Each shackle has also a recess 18 for the admission of the arm 19 of the steering wheel 20, the recesses being so arranged that the shackles completely encompass the arm of the wheel, when in locked position.

In the head 21 of the shackle 10 is mounted a lock 22 having a spring actuated bolt 23. The shackle 11 has a perforated jaw 24 that projects into a corresponding recess 25 in the shackle 10 and is adapted to receive the bolt 23 of the lock when the shackles are closed so that the latter are held securely locked together thereby.

In using the invention the base is mounted upon the steering column in a position which will admit of the shackles being swung up into locking engagement with one of the arms of the steering wheel and thus prevent the wheel from being turned upon the column. By turning the lock as with a key the bolt 23 is withdrawn from the perforated jaw 24 and the shackles are turned upon their pivots in opposite directions to their lowermost position out of the way of the operator, thus freeing the wheel so that it may be manipulated.

What I claim is:—

1. In a device for locking a steering wheel from turning upon its column, an internally recessed base member adapted to be immovably secured upon the column closing the interior thereof; a pair of shackles, one of which contains a lock and the other having a jaw adapted to be engaged by the lock when the shackles are in closed position; a screw for each of the shackles affording pivotal support therefor at its lower end and extending into the recessed base; and means concealed within the recessed base for securing the screws in place, said shackles being shaped so as to encompass one of the arms of the steering wheel when in locked position.

2. In a device for locking a steering wheel from turning upon its column, a hollow base member including means for immovably securing it upon the column so as to close its hollow; two shackles, one having a lock and the other a lug adapted to be engaged by the lock, a pivot screw for each of the shackles extending therethrough into the hollow base and secured upon the interior thereof; and a spring washer back of the head of each screw and bearing against the shackle, tending to hold the same inert against the base, said shackles being formed so as to encompass one of the arms of the wheel.

3. In a device for locking a steering wheel from turning upon its column, a base member adapted to be immovably secured upon the column; and a pair of shackles, the lower ends of which are separately supported upon corresponding pivots arranged in connection with the base in close proximity to each other so that the shackles are held in contact with each other throughout their length when in closed position, one of the shackles having in its outer end a locking means, and the other shackle having an engaging means for the lock, the shackles being so formed as to encompass one of the arms of the wheel when locked together.

In testimony whereof I affix my signature, in presence of two witnesses.

JOHN WILDING.

Witnesses:
MATILDA METTLER,
WALTER G. BURNS.